United States Patent [19]

Tsai et al.

[11] Patent Number: 4,578,435

[45] Date of Patent: Mar. 25, 1986

[54] METHOD FOR MAKING HETEROCYCLIC BLOCK COPOLYMER

[75] Inventors: Tsu-Tzu Tsai, Dayton; Fred E. Arnold, Centerville, both of Ohio

[73] Assignee: The United States of America as represented by the Secretary of the Air Force, Washington, D.C.

[21] Appl. No.: 721,973

[22] Filed: Apr. 11, 1985

Related U.S. Application Data

[62] Division of Ser. No. 610,912, May 16, 1984, Pat. No. 4,544,713.

[51] Int. Cl.$^4$ .............................................. C08G 73/06
[52] U.S. Cl. ................................... 525/432; 525/435; 528/336; 528/342; 528/348
[58] Field of Search ................ 525/432, 435; 528/342, 528/336, 348

[56] References Cited

U.S. PATENT DOCUMENTS 4,108,835 8/1978 Arnold et al. ...................... 528/183
4,207,407 6/1980 Helminiak et al. ................. 525/425
4,377,546 3/1983 Helminiak et al. ................. 264/232

Primary Examiner—Harold D. Anderson
Attorney, Agent, or Firm—Donald J. Singer; Charles E. Bricker

[57] ABSTRACT

Thermally stable aromatic heterocyclic block copolymers are prepared by reacting a diamino monomer and terephthalic acid to form a carboxy-terminated rigid rod segment and then polymerizing a carboxy-monoamine monomer therewith to form flexible segments grafted onto the rigid rod segments.

6 Claims, No Drawings

METHOD FOR MAKING HETEROCYCLIC BLOCK COPOLYMER

RIGHTS OF THE GOVERNMENT

The invention described herein may be manufactured and used by or for the Government of the United States for all governmental purposes without the payment of any royalty.

This is a division of application Ser. No. 610,912, filed May 16, 1984, now U.S. Pat. No. 4,544,713.

BACKGROUND OF THE INVENTION

This invention relates a method for preparing aromatic heterocyclic block copolymers.

In general, aromatic heterocyclic extended chain polymers are well known for their outstanding thermal, physical, and chemical properties. Arnold et al, U.S. Pat. No. 4,108,835, disclose extended rod-like benzo-bis-oxazole and benzo-bis-thiazole polymers having superior mechanical properties as well as a high degree of thermal and hydrolytic stability. However, these materials presented special processing problems because of the extended-chain, rigid-rod, structural character of their molecules.

In accordance with the invention defined in U.S. Pat. No. 4,207,407, to Helminiak et al, it was found that the processing problem could be overcome by blending a coil-like, aromatic, heterocyclic polymer with a rod-like, aromatic, heterocyclic polymer. An improved method for blending coil-like and rod-like polymers is disclosed in U.S. Pat. No. 4,377,546, to Helminiak et al.

Wolfe et al, in application Ser. Nos. PCT/US82/01285 and PCT/US82/01286, both filed Sept. 17, 1982, disclose aromatic heterocyclic block copolymers made up of rigid and flexible segments. These copolymers are prepared by separating polymerizing the rigid segments and the flexible segments onto the rigid segments.

We have found that these block copolymers can be prepared by a simpler procedure.

Accordingly, it is an object of the present invention to provide a method for preparing aromatic heterocyclic block copolymers having rigid and flexible segments.

Other objects and advantages of the present invention will be apparent to those skilled in the art.

DESCRIPTION OF THE INVENTION

In accordance with the present invention, there is provided a method for preparing aromatic heterocyclic block copolymers having rigid and flexible segments of the general formulas:

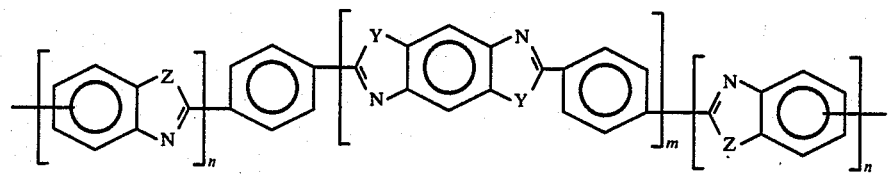

Ia or,

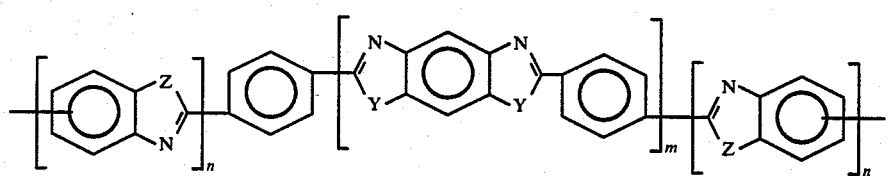

Ib wherein Y and Z are the same or different and are selected from the group consisting of =NH, =S, =O and =NC$_6$H$_5$; m is an integer equal to the number of repeating units and has a value such that the rigid segment has an intrinsic viscosity of about 8 to 31 dl/g as determined in methanesulfonic acid at RT; and n is an integer equal to the number of repeating units and has a value such that the polymer Ia or Ib has an intrinsic viscosity of about 4 to about 24 dl/g as measured in methane sulfonic acid at RT.

The method of this invention comprises the steps of preparing the rigid rod polymer block in polyphosphoric acid (PPA) followed by addition of a copolymerizable monomer and copolymerization of the same. The rigid rod segment is prepared according to the following general reactions:

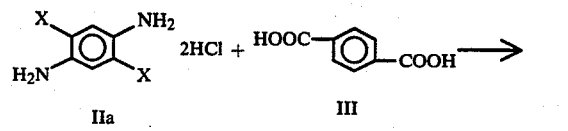

IIa     III

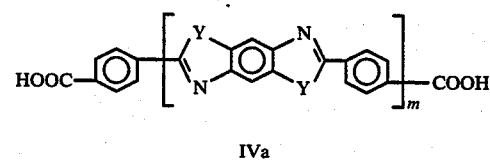

IVa or,

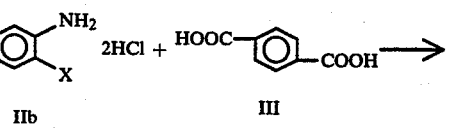

IIb     III

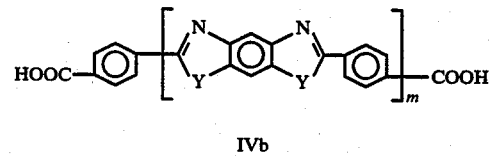

IVb wherein n and Y are as described previously, and X is —NH₂, —SH, —OH or —NHC₆H₅.

Following polymerization of the rigid rod segment IVa or IVb, a copolymerizable monomer of the general formula

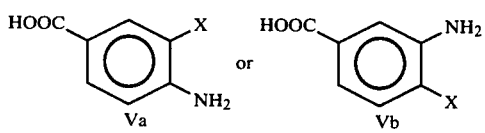

wherein X is as previously defined, is added to the reaction mixture containing the rigid rod segment, and polymerization of the flexible segments as well as grafting of these segments onto the rigid rod segments is carried out.

In carrying out the process, the diamino monomer IIa or IIb is initially dehydrochlorinated. This is accomplished by mixing the monomer IIa or IIb and terephthalic acid with polyphosphoric acid and heating the mixture under an inert gas atmosphere at a temperature ranging from about 40° to 100° C. for a period of about 6 to 24 hours. A slight excess of one of the monomers is employed.

Following dehydrochlorination, the reaction mixture is heated at a temperature in the approximate range of 100° to 200° C. for a period of about 18 to 36 hours. In a preferred procedure, the reaction temperature is increased gradually during the reaction period, e.g., 130° C. for 3 hours, 150° C. for 3 hours, 170° C. for hours, 185° C. for 3 hours, and 195°–200° C. for 16 hours, or 160° C. for 16 hours and 190° C. for 16 hours, or the like. At the end of the reaction period, a small aliquot of the polymer is precipitated from solution into water, washed with water until acid-free and air dried. If the intrinsic viscosity of the polymer in methanesulfonic acid is not within the desired range of about 8 to 31 dl/g, polymerization is continued until an aliquot sample has the desired viscosity.

Once the rigid-rod segment has a desired intrinsic viscosity, as determined by one or more aliquot samples, the reaction mixture, is cooled to about 30° to 60° C. and the monomer Va or Vb is added thereto. The resulting mixture is heated under an inert gas atmosphere at a temperature ranging from about 40° to about 100° C. for a period of about 6 to 24 hours to effect the dehydrochlorination of monomer Va or Vb. Following the dehydrochlorination, the reaction mixture is heated at a temperature in the approximate range of 100° to 250° C. for a period of about 12 to 36 hours. Aliquot samples may be collected, as described previously, to determine the intrinsic viscosity of the resulting polymer.

Intrinsic viscosity is determined by extrapolation of $\eta$ rel-1/c and ln $\eta$ rel/c to zero concentration in methanesulfonic acid at RT.

At the end of the reaction period the polymer is precipitated from solution by pouring the reaction mixture into a coagulation bath, such as water or methanol. If a bulk polymer is desired, the reaction mixture is poured directly into the coagulation bath, with or without stirring. The polymer may also be formed into fibers by extruding the polymer/PPA solution through a suitable spinnerette into the coagulation bath. The resulting fiber may be drawn and heat-treated following known procedures.

The relative proportions of the rigid-rod segment to the flexible segments can range from about 1:5 to 5:1, preferably 1:3 to 3:1.

The extended chain polymer compositions of the present invention are suitable for spinning into highly ordered and high strength fibers. Such fibers are suitable substitutes for other inorganic or organic products.

The following examples illustrate the invention.

EXAMPLE I 2,5-Diamino-1,4-benzenedithiol dihydrochloride (3.04 g, 12.4 mmol) and terephthalic acid (2.08 g, 12.5 mmol) were placed in a 50 ml resin flask equipped with mechanical stirrer and nitrogen inlet/outlet tubes. 76 g of polyphosphoric acid (84% $P_2O_5$) was added to the flask. The resulting mixture was stirred and heated to 40° C. for 8 hours and 70° C. for 12 hours to effect dehydrochlorination of the diamino monomer. The reaction mixture was then heated to 160° C. for 16 hours followed by heating to 190° C. for an additional 16 hours. A small aliquot of the polymer was precipitated into water, washed with water until acid free, then air dried. This sample had an intrinsic viscosity of 12.9 dl/g in methanesulfonic acid at RT.

To 14.8 g of the above polyphosphoric acid solution containing 0.66 g of carboxy-terminated rigid rod, was added 3,4-diaminobenzoic acid monohydrochloride (3.23 g, 1.7 mmol). After the system was purged with nitrogen, 103 g of polyphosphoric acid (84% $P_2O_5$) was added. The resulting mixture was slowly heated to 100° C. and maintained at that temperature for 10 hours to effect dehydrochlorination. The reaction mixture was then heated to 200° C. for 3 hours, then 230° C. for 16 hours. The viscous solution was cooled to 100° C., precipitated into water, washed with water, then dried at 140° C. under reduced pressure. Yield 2.16 g (82%).

Analysis for 75% $C_7H_4N_2 \cdot H_2O$-25% $C_{14}H_6N_2S_2$: Calculated: C,62.7; H,3.93; N,18.28 Found: C,60.96; H,3.94; N,18.42

The polymer had an intrinsic viscosity of 10.7 dl/g in methanesulfonic acid at RT. Films of the above block copolymer cast from methanesulfonic acid exhibited the following mechanical properties: Tensile, 40,100 psi; Modulus, 350,000 psi.

EXAMPLE II

The procedure given in Example I was carried out to prepare a like copolymer containing 50% rigid rod/50% flexible. Films of this copolymer had the following mechanical properties: Tensile, 9,700 psi; Modulus, 1,520,000 psi.

EXAMPLE III

To 0.53 g of a carboxy-terminated poly-paraphenylenebenzbisthiazole (intrinsic viscosity, 17.75 dl/g) was added 88 g of polyphosphoric acid (84% $P_2O_5$). The mixture was heated under nitrogen at 160° C. until a homogeneous solution was obtained. The solution was cooled to 50° C. and 1.92 g (0.0093 mol) of 4-amino-3-mercaptobenzoic acid hydrochloride was added thereto under reduced pressure. The temperature was maintained at 50° C. until dehydrochlorination was complete. The reaction mixture was slowly heated to 190° C. and maintained at that temperature for 24 hours. On cooling to room temperature the polymer was precipitated into water, washed and dried at 140° C. under reduced pressure.

Analysis for 30% $C_{14}J_6N_2S_2$-70% $C_7H_3NS$: Calculated: C,63.13; H,2.80; N,10.51; S,24.09 Found: C,61.31; H,2.48; N,10.26; S,21.90

Intrinsic viscosity 6.5 dl/g.

EXAMPLE IV

Fibers were made by extruding a solution containing 5.8 wt% of the block copolymer of Example I in methanesulfonic acid through a single hole 254 micron spinnerette into a quenching bath of deionized water at room temperature. The coagulated fiber was drawn between two rollers at a draw ratio of 3.4. The fibers were neutralized in ammonium hydroxide solution over night, washed with deionized water and air dried.

The block copolymer fibers were heat treated by passing them through an oven under constant tension in an air atmosphere. Residence time of the fiber was 30 sec. at 800° F.

The data presented in the following table demonstrate the excellent mechanical properties of these fibers. For comparison the mechanical properties of a polybenzimide (PBI) fiber are included.

TABLE

|  | w % Flexible Segment | w % rigid segment | Youngs Modulus (psi) | Tensile (psi) | Elongation at break |
|---|---|---|---|---|---|
| As spun | 70 | 30 | $4.83 \times 10^6$ | $13.4 \times 10^4$ | 6.5 |
| Heat Treated | 70 | 30 | $15.94 \times 10^6$ | $20.34 \times 10^4$ | 1.4 |
|  | 100 (PBI) | 0 | $2.09 \times 10^6$ | $9.6 \times 10^4$ | 28% |

Various modifications may be made to the present invention without departing from the spirit or the scope of the following claims.

We claim:

1. A method for preparing a thermally stable aromatic heterocyclic block copolymer of the general formula

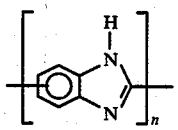

-continued

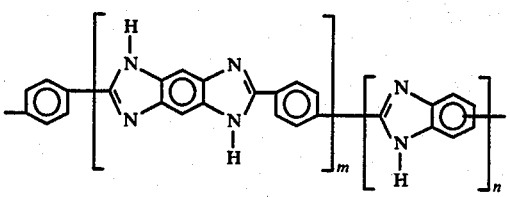

wherein m is an integer equal to the number of repeating units of the rigid rod segment and n is an integer equal to the number of repeating units of the flexible end segments, which comprises the steps of (a) reacting 1,2,4,5-tetraaminobenzene with terephthalic acid in polyphosphoric acid (PPA) under reaction conditions to form carboxy-terminated rigid rod segments;

(b) adding 2,3-diaminobenzoic acid to the reaction mixture of PPA and rigid rod segments, and polymerizing said 2,3-diaminobenzoic acid to form flexible segments grafted onto said rigid rod segments;

and (c) recovering the resulting block copolymer.

2. The method of claim 1 wherein said reaction step (a) is conducted at a temperature in the approximate range of 100° to 200° C. for a period of about 18 to 36 hours until said rigid rod segment has an inherent viscosity in methanesulfonic acid at room temperature in the approximate range of 8 to 31 dl/g and wherein said step (b) is conducted at a temperature in the approximate range of 100° to 200° C. for a period of about 12 to 36 hours.

3. The method of claim 1 wherein the relative proportion of rigid:flexible is in the approximate range 1:5 to 5:1.

4. The method of claim 3 wherein the ratio rigid:flexible is in the approximate range of 1:3 to 3:1.

5. The method of claim 1 wherein said recovery step (c) comprises precipitating said polymer in bulk from solution into a coagulating bath.

6. The method of claim 1 wherein said recovery step (c) comprises precipitating said polymer by extruding the reaction mixture of PPA and polymer through a spinnerette into a coagulating bath.

* * * * *